United States Patent
Daniel et al.

(10) Patent No.: US 9,434,018 B2
(45) Date of Patent: Sep. 6, 2016

(54) AUTOMATIC BURNBACK CONTROL IN AN ARC WELDING SYSTEM

(75) Inventors: Joseph A. Daniel, Sagamore Hills, OH (US); Elliott R. Ash, Brecksville, OH (US)

(73) Assignee: Lincoln Global, Inc., City of Industry, CA (US)

( * ) Notice: Subject to any disclaimer, the term of this patent is extended or adjusted under 35 U.S.C. 154(b) by 2105 days.

(21) Appl. No.: 12/428,675

(22) Filed: Apr. 23, 2009

(65) Prior Publication Data

US 2010/0270278 A1  Oct. 28, 2010

(51) Int. Cl.
*B23K 9/10* (2006.01)
*B23K 9/12* (2006.01)

(52) U.S. Cl.
CPC ............ *B23K 9/124* (2013.01); *B23K 9/126* (2013.01)

(58) Field of Classification Search
CPC ......... B23K 9/10; B23K 9/124; B23K 9/126
USPC .............. 219/130.21, 137.71, 135.5, 130.31, 219/137 R
See application file for complete search history.

(56) References Cited

U.S. PATENT DOCUMENTS

| | | | |
|---|---|---|---|
| 2,897,343 A * | 7/1959 | Regnauld et al. | 219/130.21 |
| 3,501,614 A * | 3/1970 | Allen | 219/130.21 |
| 4,347,426 A | 8/1982 | Ware et al. | |
| 4,443,687 A * | 4/1984 | Toth | 219/130.21 |
| 5,315,089 A | 5/1994 | Hughes et al. | |
| 7,427,726 B2 | 9/2008 | Enyedy et al. | |
| 2007/0056942 A1* | 3/2007 | Daniel et al. | 219/125.1 |

FOREIGN PATENT DOCUMENTS

| | | |
|---|---|---|
| GB | 913565 A | 12/1962 |
| JP | 55126375 A | 9/1980 |
| JP | 61193779 A | 8/1986 |
| JP | 62009773 A | 1/1987 |
| JP | 2001259839 A | 9/2001 |

\* cited by examiner

*Primary Examiner* — Dana Ross
*Assistant Examiner* — Ayub Maye
(74) *Attorney, Agent, or Firm* — Hahn Loeser & Parks LLP (57) ABSTRACT

An arc welding system and method where burnback time (BBT) is correlated to wire feed speed (WFS). Means for feeding a wire electrode toward a workpiece and means for selecting a wire feed speed (WFS) are provided. Also, means for automatically adjusting a burnback time (BBT) of the wire electrode in response to the selected wire feed speed (WFS) is provided.

20 Claims, 8 Drawing Sheets

AUTOMATIC BURNBACK CONTROL IN AN ARC WELDING SYSTEM

TECHNICAL FIELD

The claimed invention relates to wire electrode fed arc welding and, more particularly, to adjusting burnback time as a function of wire feed speed.

BACKGROUND

Arc welding systems which feed a wire electrode toward a workpiece are well known in the art. Such arc welding systems often include a welding gun operatively connected to a wire feeder apparatus, and a welding power source operatively connected to the wire feeder apparatus. The speed at which the wire electrode is fed toward the workpiece may be set or selected by a user via the wire feeder apparatus. The welding power source provides the electric current which is provided to the wire electrode.

In a wire electrode fed arc welding system, burnback time is a relatively short period of time occurring at the end of a weld when the wire feed stops but electric current is still applied to the wire electrode. This allows the wire electrode to be burned back such that it does not stick in the resultant weld. In a typical arc welding system, when a user releases a trigger on a welding gun after completing a weld, a wire feeder stops advancing the wire electrode toward the weld, but electric current is still applied to the wire electrode during the burnback time.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY

Certain embodiments of the present invention comprise an arc welding system and method providing means for feeding a wire electrode toward a workpiece and means for selecting a wire feed speed (WFS). Also, means for automatically adjusting a burnback time (BBT) of the wire electrode in response to the selected wire feed speed (WFS) is provided.

These and other features of the claimed invention, as well as details of illustrated embodiments thereof, will be more fully understood from the following description and drawings.

DETAILED DESCRIPTION

In wire fed electric arc welding, burnback time is a relatively short period of time occurring at the end of a weld when the wire feed stops but electric current is still applied to the wire electrode. This allows the wire electrode to be burned back such that it does not stick in the resultant weld. In a typical arc welding system, when a user releases a trigger on a welding gun after completing a weld, a wire feeder stops advancing the wire electrode toward the weld, but electric current is still applied to the wire electrode during the burnback time.

Figure 1:
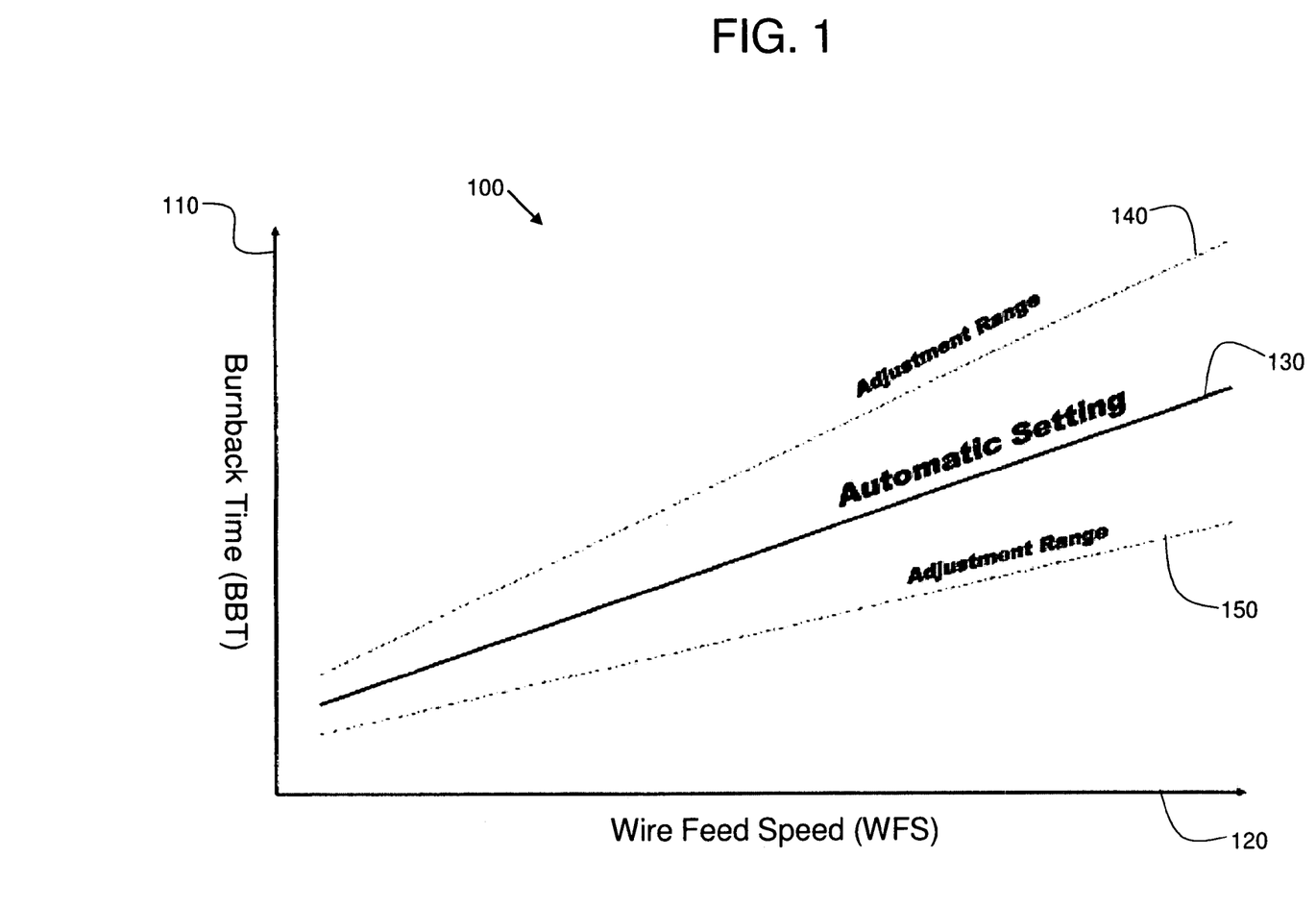
FIG. 1 illustrates a graph showing a first example relationship between burnback time and wire feed speed for an embodiment of an arc welding system.

FIG. 1 illustrates a graph 100 showing a first example relationship between burnback time (BBT) 110 and wire feed speed (WFS) 120 for an embodiment of an arc welding system. As WFS 120 increases, BBT 110 automatically increases in a linear manner. The solid line 130 of the graph 100 shows the linear relationship. In general, as wire feed speed increases, it is desirable for burnback time to increase. The relationship between wire feed speed and burnback time may be optimized based on the drive characteristics of a wire feeder of the arc welding system such that just enough wire burns back when a user releases the trigger of an arc welding gun to prevent the end of the wire electrode from sticking to the weld. The dashed lines 140 and 150 illustrate the boundaries of a further adjustment range about the automatic setting line 130 which may allow for further manual adjustment of BBT 110 by a user to account for particular user characteristics and/or preferences.

Figure 2:
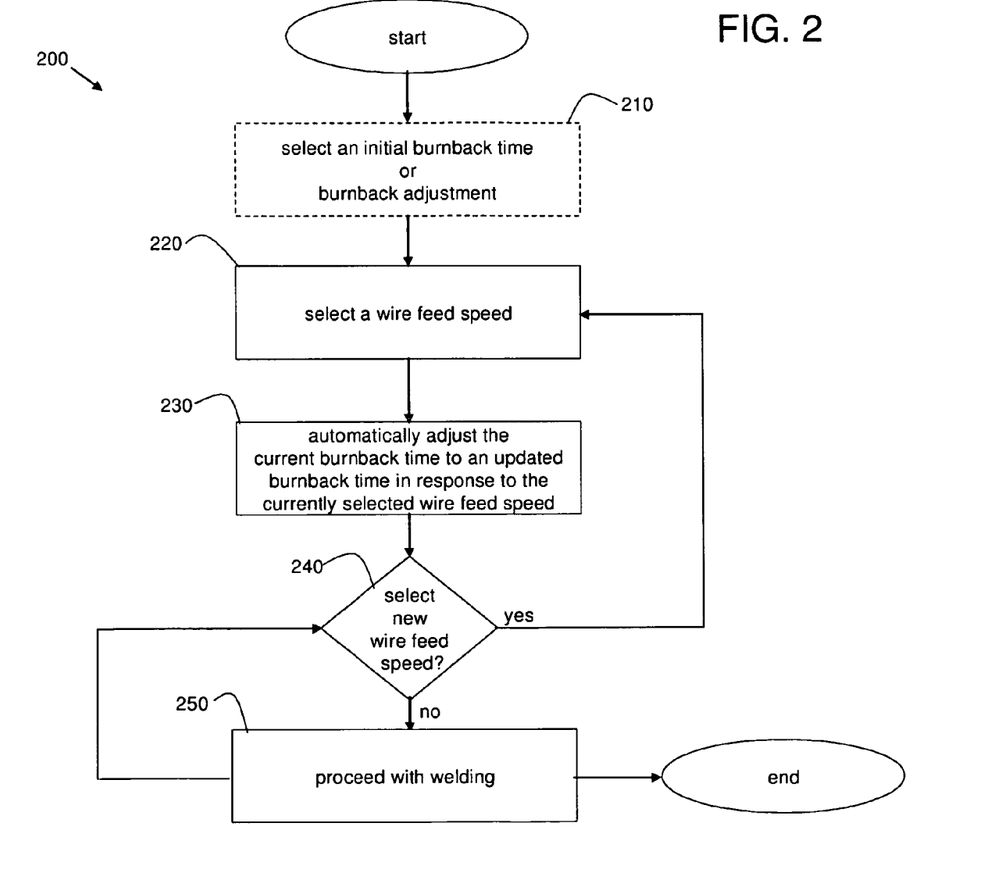
FIG. 2 illustrates a flow chart of an example embodiment of a method of automatically adjusting burnback time as a function of wire feed speed.

FIG. 2 illustrates a flow chart of an example embodiment of a method 200 of automatically adjusting burnback time as a function of wire feed speed. In step 210, an initial burnback time (or adjustment, for example, a percentage adjustment) is selected. Step 210 is optional, however. In step 220, a wire feed speed is selected. In step 230, the burnback time is automatically adjusted or selected in response to the currently selected wire feed speed. In step 240, a decision is made with respect to selecting a new wire feed speed or not. If the decision in step 240 is not to select a new wire feed speed, then a welding process may proceed in step 250 using the current burnback time. If, however, the decision in step 240 is to select a new wire feed speed, then the method reverts back to step 220 where a new wire feed speed is selected. Subsequently, the method proceeds to step 230 where the burnback time is automatically adjusted in response to the newly selected wire feed speed. The resultant burnback time tracks the graph 100 as a function of selected wire feed speed, in accordance with an embodiment of the present invention.

Figure 3:
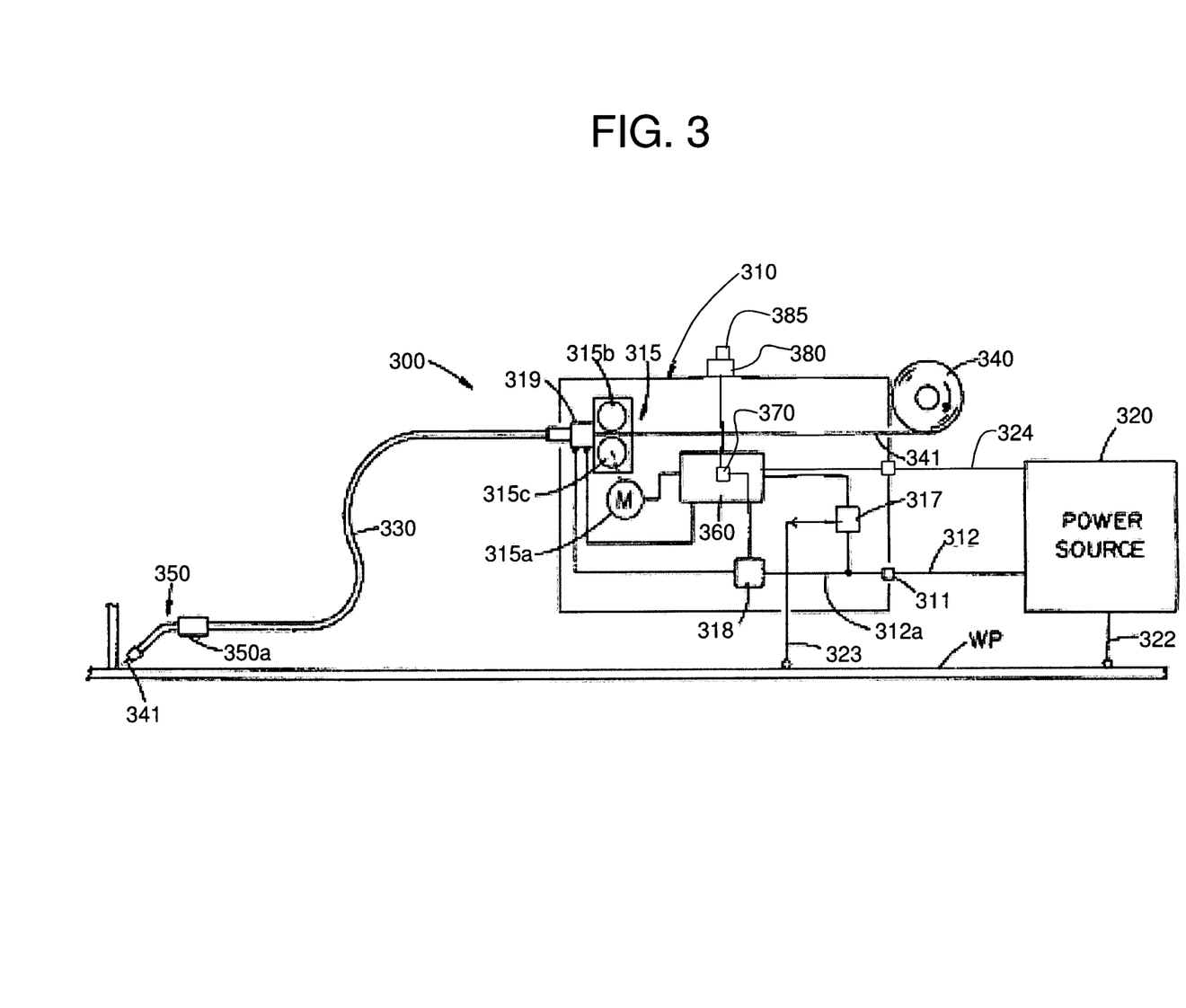
FIG. 3 illustrates a schematic block diagram of an example embodiment of an arc welding system employing the relationship of FIG. 1 and the method of FIG. 2.

FIG. 3 illustrates a schematic block diagram of an example embodiment of an arc welding system 300 employing the relationship between wire feed speed and burnback time of FIG. 1 and the method 200 of FIG. 2. The arc welding system 300 includes a wire feeder 310, a welding power source 320, a spool of wire 340, and a welding gun 350. The welding gun 350 is operatively connected to the wire feeder 310 via a guide hose 330. The power source 320 is operatively connected to the wire feeder 310 and a workpiece WP as is described below.

With reference to FIG. 3, the wire feeder 310 includes an input 311 that is electrically connected to the power source 320 by input cable 312 for receiving welding current (i.e., arc voltage) from the power source 320. Power for a motorized feeding system 315 of the wire feeder 310 and the wire feeder's control circuitry is drawn from the welding current supplied by the power source 320 and, in the illustrated embodiment, passed through a power converter 317 (such as a rectifier, for example). The remaining electrode 312a (or welding current path) is directed through a contactor 318 and to an output 319 of the wire feeder 310. Thus, the output 319 is electrically connected (selectively) to the input 311 to receive welding current delivered to the input from the power source and to provide the welding current to the welding operation through the guide hose 330. The power drawn off the welding current and passing through the power converter 317 is used to power a motorized feeding system 315 and other control circuitry of the wire feeder 310. As is well known to those skilled in the art, the motorized feeding system 315 includes a motor 315a and driver rollers 315b and 315c to selectively advance or pay welding electrode wire 341 from a supply of wire, such as spool 340, to the output 319 and through the guide hose 330 to the welding gun 350. The output 319 additionally serves to provide the wire 341 to the welding operation through the guide hose 330.

Other control circuitry may include, for example, circuit board or controller 360 which can receive and direct power from the power converter 317 and send/receive signals for operating the wire feeder 310. The controller 360, for example, operates the contactor 318 to selectively direct welding current 312a from the input 311 to the output 319, and operate the motor 315a of the motorized feed system 315. Typically, the controller 360 is electrically connected to a trigger 350a of the gun 350 through the output 319 and guide hose 330 and further electrically connected to both the contactor 318 and the motor 315a so that, upon receipt of an actuation signal from the trigger 350a (occurring upon depression of the trigger), the controller 360 actuates the motor 315a (and thereby the motorized feeding system 315) and actuates the contactor 318 to send welding current from the input 311 to the output 319 wherein it is electrically connected to the wire 341.

To complete respective power circuits, the power source 320 is grounded to the work piece WP through lead 322 and the power converter 317 of the wire feeder 310 may be optionally grounded to the work piece through grounding assembly 323 (shown in FIG. 3 as lead 323), thereby grounding the motorized feeding system 315 and other control circuitry (e.g., circuit board 360) of the wire feeder 310. A control cable 324 may optionally extend between the power source 320 and the wire feeder 310. Such a control cable 324 may be used to communicate control signals between the power source 320 and the feeder 310. For example, burnback time may be communicated from the wire feeder 310 to the power source 320 over the control cable 324.

Figure 4:
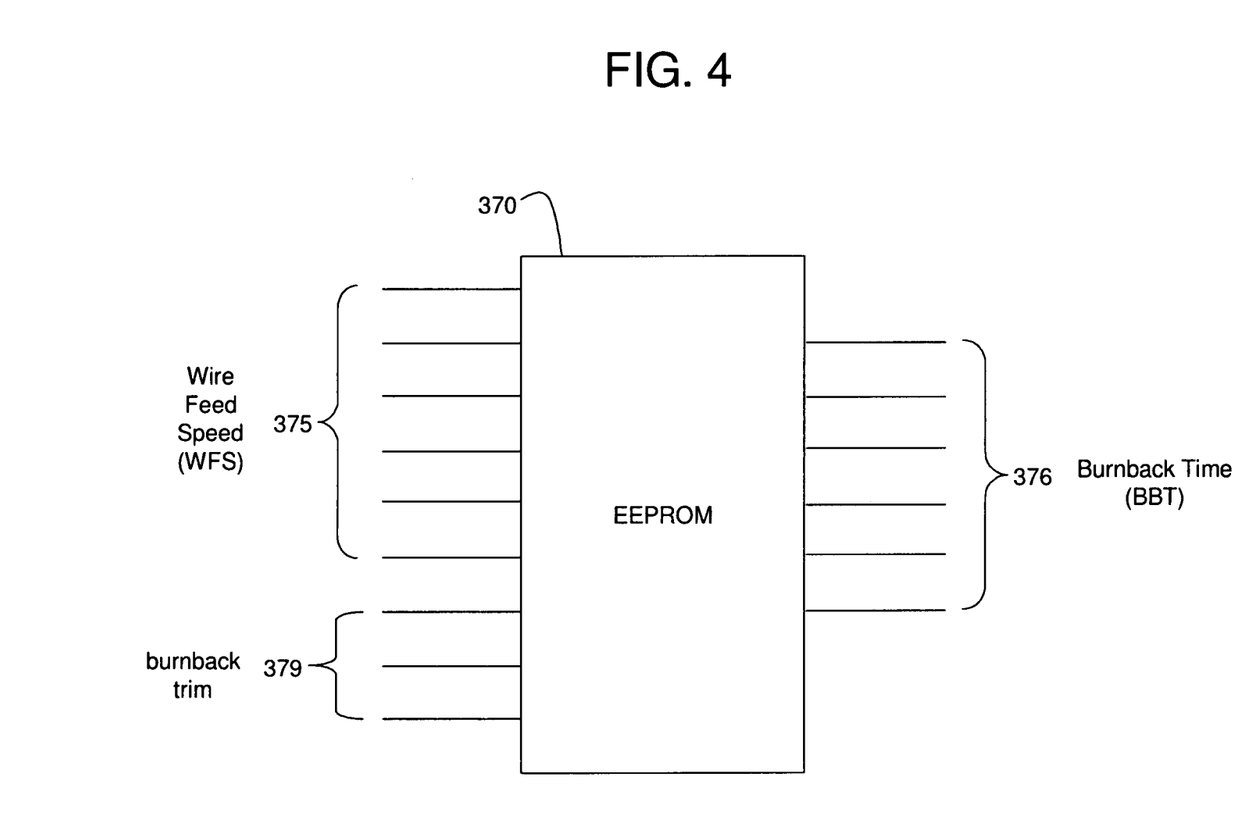
FIG. 4 illustrates an example embodiment of an addressable electronic look-up-table (LUT) used in the arc welding system of FIG. 3 to store burnback time as a function of wire feed speed.

The wire feeder 310 further includes an addressable electronic look-up-table (LUT) 370 which may be part of the electronic controller 360. Alternatively, the addressable electronic LUT 370 and/or the electronic controller 360 may be part of the power source 320. FIG. 4 illustrates an example embodiment of an addressable electronic look-up-table (LUT) 370 used in the arc welding system 300 of FIG. 3 to store burnback time as a function of wire feed speed. When the relationship between burnback time and wire feed speed is established as shown in the graph 100 of FIG. 1, such a relationship may be encoded in the addressable LUT 370. In accordance with an embodiment of the present invention, the addressable LUT 370 is an electrically erasable programmable read-only memory (EEPROM) device. In accordance with certain other embodiments of the present invention, the addressable LUT 370 may be a field programmable gate array (FPGA) device, or a random access memory (RAM) device.

Referring again to FIG. 3, a user of the welding system 300 may select a wire feed speed (WFS) via a WFS selector 380 on the wire feeder 310. The WFS selector 380 interfaces with the addressable LUT 370 such that a digital word in the form of digital data is sent to the WFS address input 375 of the addressable LUT 370 and is representative of the selected wire feed speed. The addressable LUT 370 is programmed such that, whenever digital data representative of a particular wire feed speed is presented to the WFS address input 375 of the addressable LUT 370, a digital word in the form of digital data is output from the LUT output 376 of the addressable LUT 370 and is representative of a correlated or corresponding burnback time (BBT). In accordance with an embodiment of the present invention, burnback time may range from 0 seconds to 250 milliseconds. Wire feed speed may range from 40 inches per minute to 1200 inches per minute.

This output burnback time, being automatically accessed from the LUT 370 in response to the selected wire feed speed, is subsequently used as the operable burnback time during a welding operation. Therefore, as a user changes the selected wire feed speed via the WFS selector 380, the burnback time will automatically be adjusted based on the programmed relationship between wire feed speed and burnback time within the LUT 370 (e.g., according to the graph of FIG. 1). Therefore, a user does not have to select both wire feed speed and burnback time separately. Furthermore, a burnback trim knob 385 may be provided on the wire feeder 310, allowing a user to further finely adjust the burnback time within a predefined adjustment range about the selected burnback time (e.g., as indicated by the dashed lines 140 and 150 of FIG. 1). For example, additional input address lines 379 to the LUT 370 may be provided to accommodate the burnback trim selection.

In accordance with an embodiment of the present invention, the burnback time (in the form of a digital word output from the LUT 370) may be used by the controller 360 to keep welding current flowing through the contactor 318 to the output 319 and, therefore, to the wire 341 after the user has released the trigger 350a of the welding gun 350 which stops the advance of the wire 341 toward the workpiece WP. Once the burnback time has elapsed, the controller 360 turns off the contactor 318 such that welding current may no longer flow to the output 319. As a result, even though the user has released the trigger 350a, welding current is provided to the wire 341 for the duration of the burnback time to allow the wire 341 to burn back (i.e., melt back) such that the end of the wire 341 does not stick to the weld on the workpiece WP.

In accordance with an alternative embodiment of the present invention, instead of turning off a contactor in the wire feeder 310 once the burnback time has elapsed, the power source 320 may turn off the flow of current to the input 311 once the burnback time has elapsed. In such an alternative embodiment, the controller 360 may communicate the burnback time to the power source 320 via the control cable 324, or the controller 360 may communicate a shutoff signal to the power source 320 via the control cable 324 once the burnback time has elapsed, or the burnback time may originally be stored in the power source 320 and the signal indicating the release of the trigger 350a may be communicated back to the power source 320 via the control cable 324 to initiate the elapse of the burnback time within the power source 320.

In accordance with an embodiment of the present invention, the output burnback time from the LUT 370 (e.g., for a particular selected WFS) may be an operating burnback time (e.g., 150 milliseconds) over which time the welding current gets applied to the wire after the trigger 350a is released. Alternatively, the output burnback time from the LUT 370 may be an offset burnback time (e.g., 50 milliseconds) that gets added to an initial or base burnback time (e.g., 100 milliseconds) that was previously selected by the user, for example. The sum of the offset burnback time and the base burnback time result in a final or operating burnback time (e.g., 150 milliseconds) over which the welding current gets applied to the wire after the trigger 350a is released.

Figure 5:
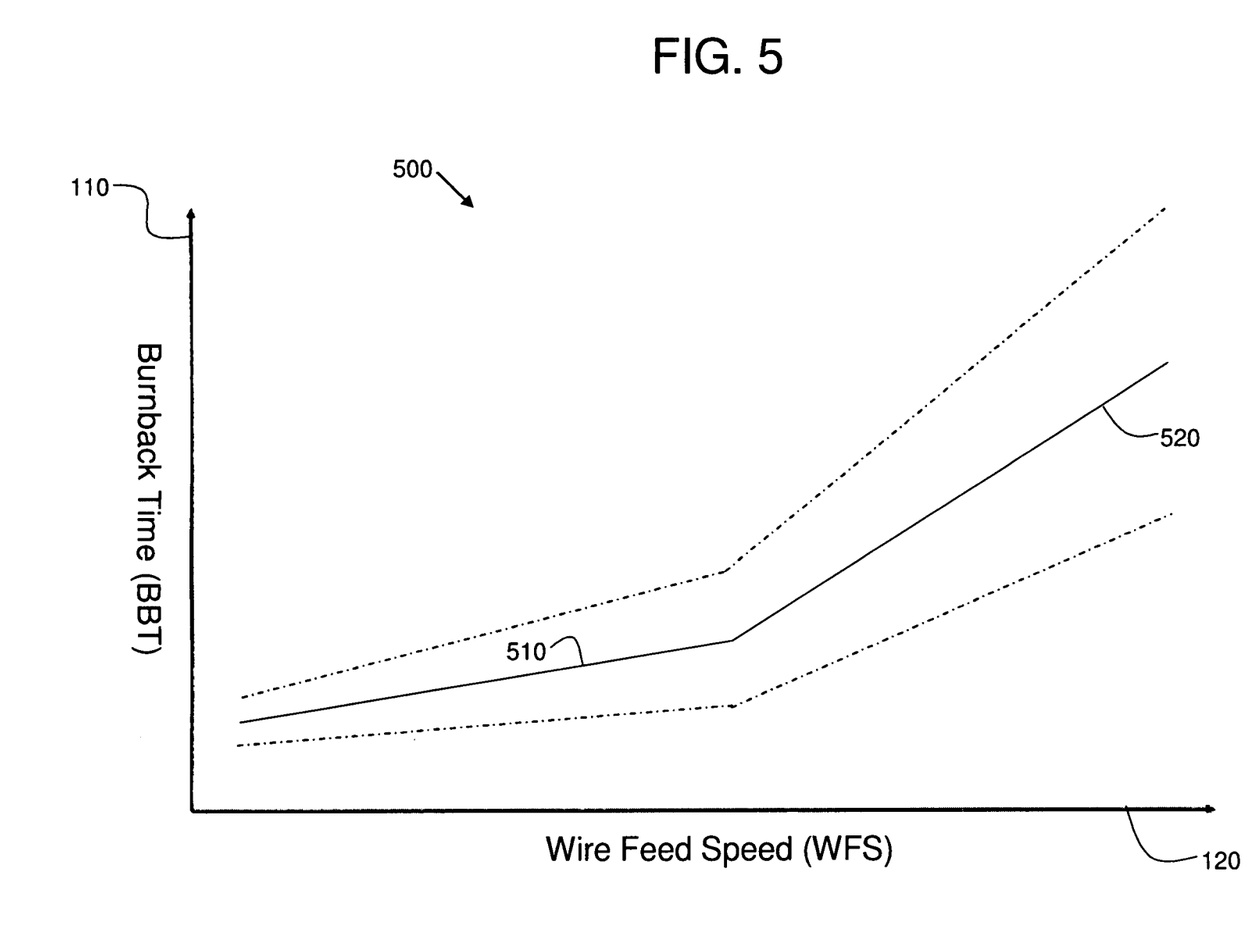
FIG. 5 illustrates a graph showing a second example relationship between burnback time and wire feed speed in an embodiment of an arc welding system.

FIG. 5 illustrates a graph 500 showing a second example relationship between burnback time 110 and wire feed speed 120 in an embodiment of an arc welding system. The relationship shown in FIG. 5 is a piece-wise linear relationship. That is, the relationship between burnback time and wire feed speed follows a linear relationship according to the solid line 510 over a lower range of wire feed speeds, and follows a different linear relationship (having a steeper slope) according to the solid line 520 over a higher range of wire feed speeds. Similarly as for FIG. 1, the dashed lines of FIG. 5 define the boundaries of a further adjustment range about the automatic setting lines 510 and 520 which may allow for further manual adjustment of BBT 110 by a user to account for particular user characteristics and/or preferences (e.g., via the burnback trim knob 385 of FIG. 3). Such a piece-wise linear relationship may account for two different operating ranges of the wire feeder 310 which may provide two different ranges of force generation to the wire 341.

Figure 6:
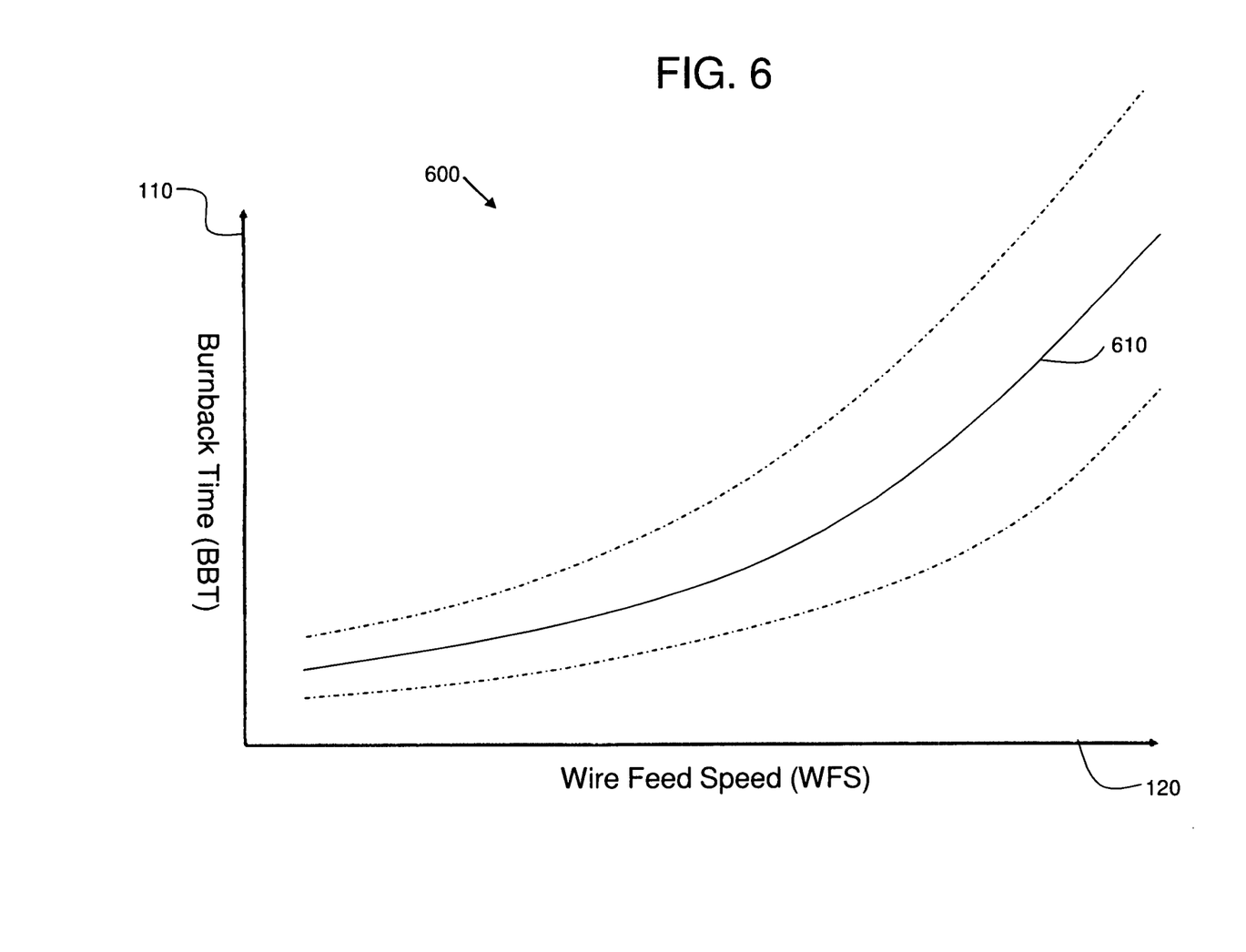
FIG. 6 illustrates a graph showing a third example relationship between burnback time and wire feed speed in an embodiment of an arc welding system.

FIG. 6 illustrates a graph 600 showing a third example relationship between burnback time 110 and wire feed speed 120 in an embodiment of an arc welding system. The relationship shown in FIG. 6 is a non-linear relationship. That is, the relationship between burnback time and wire feed speed follows a non-linear relationship according to the solid line 610 over the range of wire feed speeds. Similarly as for FIG. 1, the dashed lines of FIG. 6 define the boundaries of a further adjustment range about the automatic setting line 610 which may allow for further manual adjustment of BBT 110 by a user to account for particular user characteristics and/or preferences (e.g., via the burnback trim knob 385 of FIG. 3). Such a non-linear relationship may account for certain non-linear operating characteristics of the wire feeder 310 which may provide non-linear force generation to the wire 341.

Figure 7:
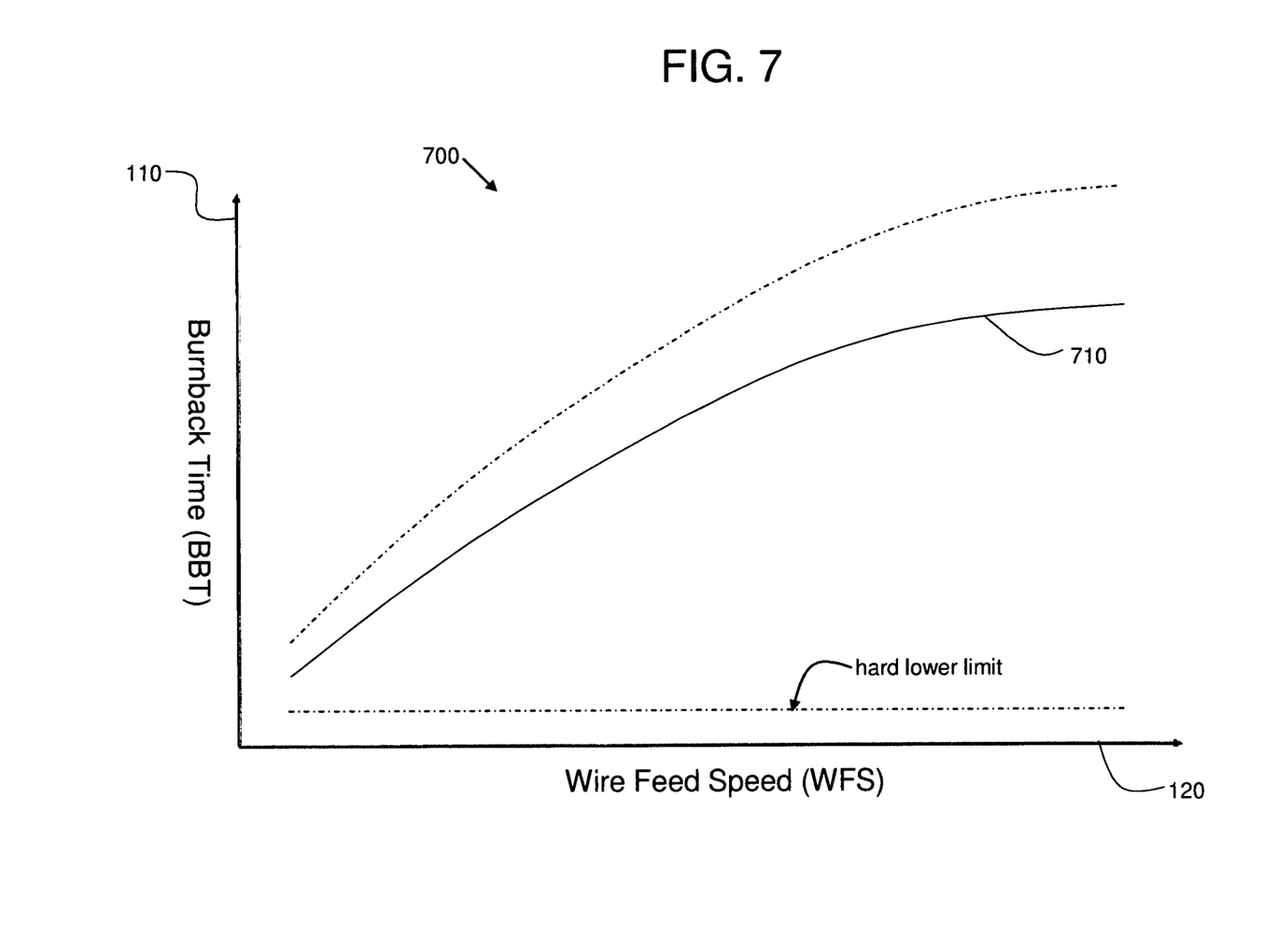
FIG. 7 illustrates a graph showing a fourth example relationship between burnback time and wire feed speed in an embodiment of an arc welding system.

FIG. 7 illustrates a graph 700 showing a fourth example relationship between burnback time 110 and wire feed speed 120 in an embodiment of an arc welding system. The relationship shown in FIG. 7 is also a non-linear relationship, which is different from the non-linear relationship of FIG. 6, however. That is, the relationship between burnback time and wire feed speed follows a non-linear relationship according to the solid line 710 over the range of wire feed speeds. Similarly as for FIG. 1, the dashed lines of FIG. 7 define the boundaries of a further adjustment range about the automatic setting line 710 which may allow for further manual adjustment of BBT 110 by a user to account for particular user characteristics and/or preferences (e.g., via the burnback trim knob 385 of FIG. 3). Such a non-linear relationship may account for certain non-linear operating characteristics of the wire feeder 310 which may provide non-linear force generation to the wire 341. Other relationships between wire feed speed and burnback time are possible as well. In the example of FIG. 7, a hard minimum manual adjustment level is shown.

Figure 8:
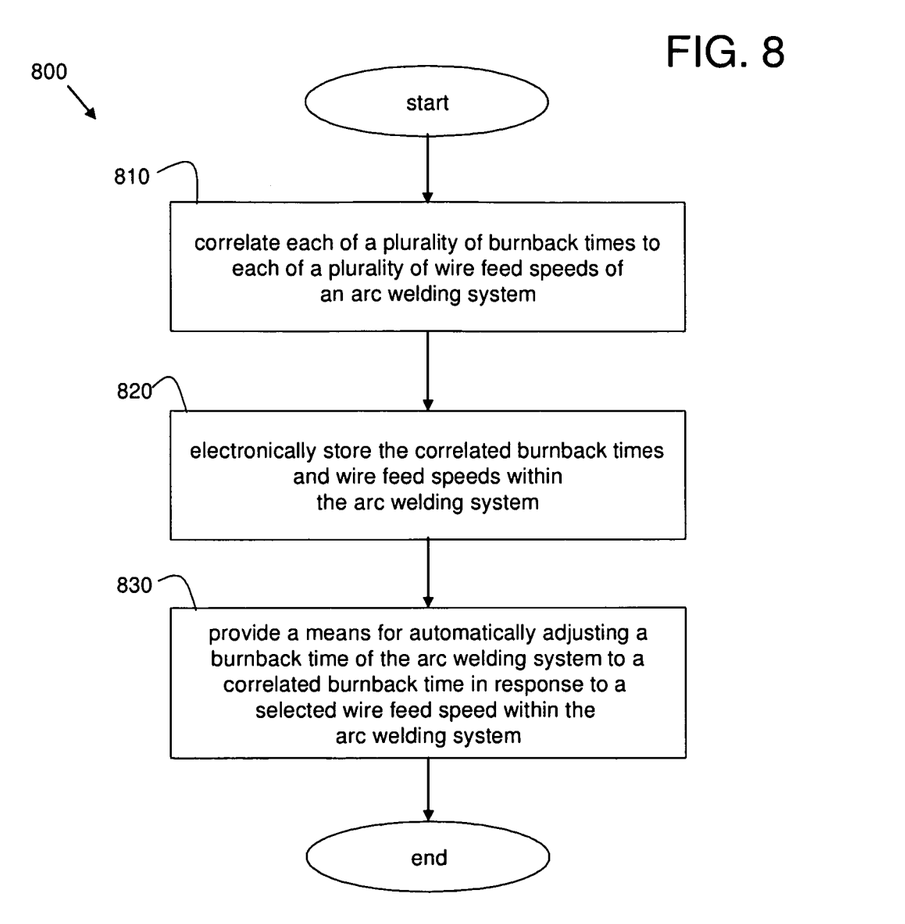
FIG. 8 illustrates a flowchart of an example embodiment of a method of establishing a burnback time in an arc welding system as a function of wire feed speed.

FIG. 8 illustrates a flowchart of an example embodiment of a method 800 of establishing a burnback time in an arc welding system as a function of wire feed speed. In step 810, correlate each of a plurality of burnback times to each of a plurality of wire feed speeds of the arc welding system. The correlation may be done based on known driver characteristics of the wire feeder. Such known characteristics may include, for example, inertial parameters of the motorized feeding system, and force gripping characteristics of a wire gripper of the wire feeder. In step 820, electronically store the correlated burnback times and wire feed speeds within the arc welding system. In step 830, provide a means for automatically adjusting a burnback time of the arc welding system to a correlated burnback time in response to a selected wire feed speed within the arc welding system based on the electronically stored and correlated burnback times and wire feed speeds.

In summary, an arc welding system and method where burnback time (BBT) is correlated to wire feed speed (WFS) are disclosed. Burnback time is a function of (or is dependent on) wire feed speed, for example, throughout the entire wire feed speed range of the arc welding system. Burnback times are predetermined such that, when a particular wire feed speed is selected by a user, a corresponding burnback time is used by the welding system. However, as an option, a user may further adjust the burnback time using a burnback trim knob, for example.

While the claimed invention has been described with reference to certain embodiments, it will be understood by those skilled in the art that various changes may be made and equivalents may be substituted without departing from the scope of the claimed invention. In addition, many modifications may be made to adapt a particular situation or material to the teachings of the claimed invention without departing from its scope. Therefore, it is intended that the claimed invention not be limited to the particular embodiment disclosed, but that the claimed invention will include all embodiments falling within the scope of the appended claims.

What is claimed is:

1. A method to automatically adjust a burnback time in an arc welding system, said method comprising:
selecting a first wire feed speed of a wire feeder of said arc welding system; and
automatically adjusting an initial burnback time of said arc welding system to a first adjusted burnback time in response to said selected first wire feed speed.

2. The method of claim 1 wherein said first adjusted burnback time is longer than said initial burnback time.

3. The method of claim 1 wherein said first adjusted burnback time is shorter than said initial burnback time.

4. The method of claim 1 further comprising further manually adjusting said burnback time within a first predefined range about said first adjusted burnback time.

5. The method of claim 1 further comprising communicating said first adjusted burnback time to a power source of said arc welding system or to a wire feeder of said arc welding system.

6. The method of claim 1 further comprising:
selecting a second wire feed speed of said wire feeder of said arc welding system; and
automatically adjusting said first adjusted burnback time to a second adjusted burnback time in response to said selected second wire feed speed.

7. The method of claim 6 wherein said second adjusted burnback time is longer than said first adjusted burnback time.

8. The method of claim 6 wherein said second adjusted burnback time is shorter than said first adjusted burnback time.

9. The method of claim 6 further comprising further manually adjusting said burnback time within a second predefined range about said second adjusted burnback time.

10. The method of claim 6 further comprising communicating said second adjusted burnback time to a power source of said arc welding system or to a wire feeder of said arc welding system.

11. An arc welding apparatus, said apparatus comprising:
means for feeding a wire electrode toward a workpiece;
means for selecting a wire feed speed of said means for feeding a wire electrode; and
means for automatically adjusting a burnback time of said wire electrode in response to said selected wire feed speed.

12. The apparatus of claim 11 further comprising means for further manually adjusting said burnback time within a predefined range about said automatically adjusted burnback time.

13. The apparatus of claim 11 further comprising means for communicating said adjusted burnback time to an arc welding power source or to said means for feeding a wire electrode.

14. The apparatus of claim 12 further comprising means for communicating said further adjusted burnback time to an arc welding power source or to said means for feeding a wire electrode.

15. A method of establishing a burnback time in an arc welding system, said method comprising:
correlating each of a plurality of burnback times to each of a plurality of wire feed speeds of said arc welding system;
electronically storing said correlated burnback times and wire feed speeds within said arc welding system; and
providing means for automatically adjusting a burnback time of said arc welding system to a correlated burnback time in response to a selected wire feed speed within said arc welding system based on said electronically stored and correlated burnback times and wire feed speeds.

16. The method of claim 15 wherein said correlated burnback times are electronically stored in an addressable electronic look-up-table (LUT) capable of being addressed by data representative of wire feed speed.

17. The method of claim 16 where said addressable electronic LUT includes a programmable read only memory (PROM) device.

18. The method of claim 16 where said addressable electronic LUT includes a field programmable gate array (FPGA) device.

19. The method of claim 16 where said addressable electronic LUT includes a random access memory (RAM) device.

20. The method of claim 15 wherein said plurality of burnback times are correlated to said plurality of wire feed speeds based on at least one wire feeder driver characteristic of said arc welding system.

* * * * *